Aug. 3, 1937.  M. J. DE MASK  2,088,845
ELECTRICAL WIRING DEVICE
Filed June 21, 1933  2 Sheets-Sheet 1
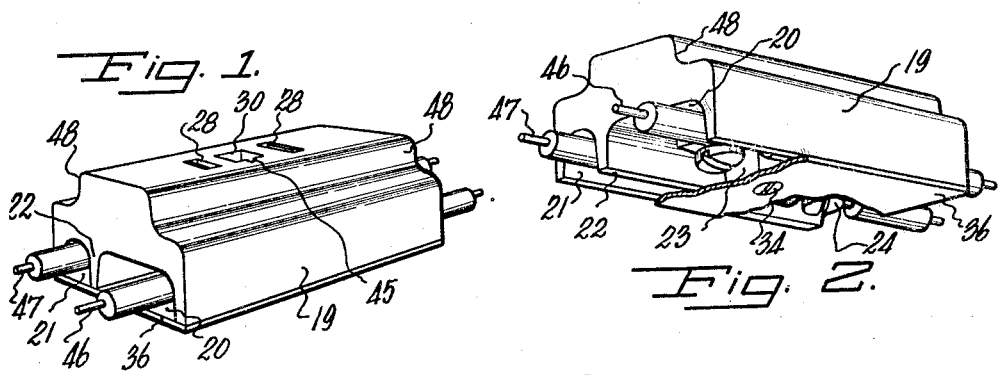
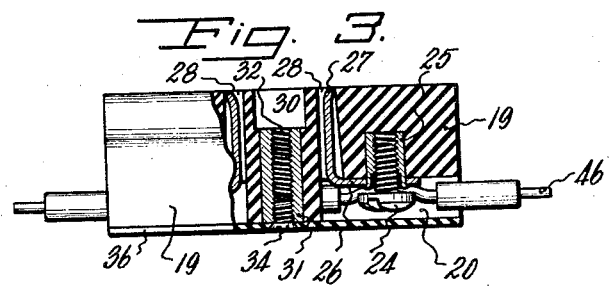
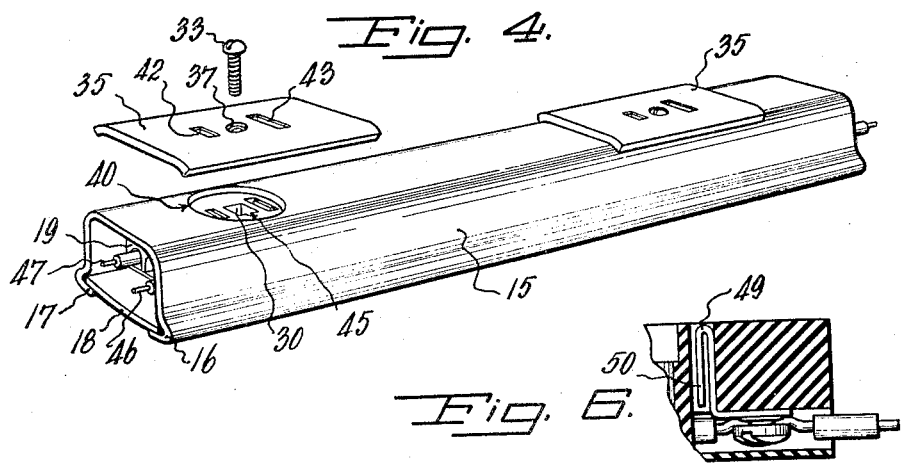
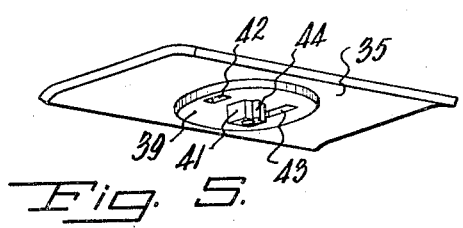
INVENTOR.
MARTIN J. DEMASK
BY Chapin & Neal
ATTORNEYS.

Aug. 3, 1937.                M. J. DE MASK                2,088,845
                      ELECTRICAL WIRING DEVICE
                         Filed June 21, 1933            2 Sheets-Sheet 2

INVENTOR.
MARTIN J. DE MASK
BY Chapin & Neal
ATTORNEYS.

Patented Aug. 3, 1937

2,088,845

UNITED STATES PATENT OFFICE 2,088,845

ELECTRICAL WIRING DEVICE

Martin J. De Mask, Pittsfield, Mass.

Application June 21, 1933, Serial No. 676,802

4 Claims. (Cl. 247—28)

In modern electrical distribution systems it has become customary for reasons of safety to enclose all wiring within a metallic sheathing or conduit. Where a plurality of receptacles or outlets have been required in a single run it has been necessary in the past to separate the conduit into short lengths interspersed with separate outlets or receptacles, or to cut away large portions of the conduit at each outlet point to permit a special fitting to be applied externally and joined to the wires extending through the conduit. By the present invention the conduit may be left intact except for a simple round hole at each outlet point, and the receptacles joined to the wires and the assembly then drawn through the conduit. By making the coupling of the wires and receptacles capable of performance on the bench instead of requiring this to be done in place a great saving in time results. The invention readily lends itself to wiring installations for outdoor use, in which a waterproof construction is necessary; both because a minimum cutting away of the conduit is required and because of certain preferred features of construction which will be described below. Several illustrative forms in which the invention has been worked out, having specific advantages for different uses, will be considered. It will be understood, however, that in its broader aspects the invention is not restricted to the particular details shown except as may be pointed out in the appended claims.

The invention will now be described in connection with the accompanying drawings, in which Fig. 1 is a perspective view of one form of receptacle adapted for insertion in a conduit of the type shown in Fig. 4;

Fig. 2 is a perspective view of the same receptacle from a different angle, and with certain parts broken away to disclose the method of connection to the wires;

Fig. 3 is a side elevation of the receptacle, partly broken away;

Fig. 4 is a perspective view of a conduit showing one receptacle completely assembled and a second receptacle with the cover removed;

Fig. 5 is a perspective view of one form of cover plate;

Fig. 6 is a fragmentary sectional detail showing a modified form of contact clip;

Figure 7:
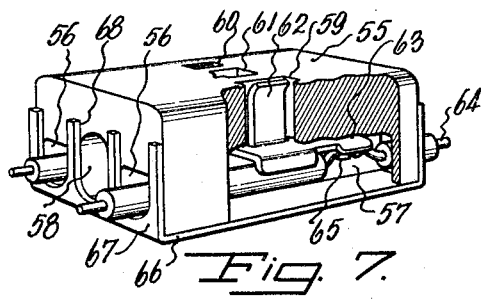
Fig. 7 is a perspective view, partly broken away, of a modified form of receptacle.

The invention will be described first in connection with the type of construction shown in Figs. 1 to 5 inclusive. This form is adapted for use with a commercial form of conduit having a channel shaped body 15 provided with beads 16 and inturned flanges 17 serving to retain a slightly arched bottom piece 18. As sold commercially this conduit comes in lengths of about ten feet which may be connected together and held in place by fittings made for the purpose. The conduit is made of steel, and protects the wiring and receptacles contained therein against any influences which might lead to breakage or short circuits. The receptacle which I have produced for use with this commercial conduit is shown in Figs. 1, 2 and 3. The body 19 of the receptacle is made of one of the moldable insulating materials now common for electrical use. In cross sectional outline this body corresponds to the internal dimensions of the conduit, but is provided with certain cut away portions to permit the passage of wiring as will be described. Two wire containing channels 20 and 21, separated by an integral barrier 22, are formed in the lower side of the body. The barrier preferably does not extend exactly centrally through the body, having a centrally offset portion 23 so that the channels 20 and 21 each have one wide end affording space for a wire clamp screw 24 of the usual type. Each of these screws is threaded into a socket 25 suitably secured in the molded body portion 19 and passing through the flange 26 of a contact clip 27. The end of the socket 25 may be swaged out to secure it to the flange 26. The two clips 27 are preferably of different widths, and extend into slots 28 in the body having lengths corresponding to the widths of their respective clips. An irreversible connection is thus provided when a plug with prongs of similar shape is used, this being desirable in all cases where polarity is important or one side of the circuit is grounded.

In the center of the block 19 is a through hole 30, preferably square in cross section, into which an insert 31 is secured by swaging or otherwise. This insert, which has a threaded hob 32 passing through its center, receives screws 33 and 34 holding a cover plate 35 and an insulating plate 36 respectively. Since it receives screws entering from opposite sides of the block the insert may be made in two sections, but from the standpoint of simplicity in construction the form described is preferred. The cover plate 35 has a conformation generally similar to the outside of the conduit, and has a hole 37 for the passage of the retaining screw 33. On its inner face this cover plate has a boss 39 conforming to the shape of the hole 40 cut in the conduit, and projecting from this is a square boss 41 adapted to enter the hole 30. The cover plate is formed with slots 42 and 43, of which the latter is the longer, to correspond with the slots 28 which it will be recalled were of unequal length. In order to insure that the long slot 43 will be aligned with the longer of the slots 28 the boss 41 is formed on one side with a projection 44 adapted to fit into a corresponding notch 45 in the side of the hole 30, or the boss 41 and the hole 30 are otherwise made unsymmetrical. The cover plate can thus be put in place in only one position. Any desired form of hole 40 may be made in the conduit, although a round one is easier to form either by drilling or by knockouts of the type usually provided on metallic electrical outlet boxes.

The receptacle as above described is preferably attached to the wires 46, 47 before the latter are drawn into the conduit. The insulating plate 36 is then attached, and the assembly in the condition shown in Figs. 1 to 3 is drawn into the conduit by the wires. If a plurality of receptacles are to be spaced along a single conduit the holes 40 are formed at the correct distances, the several receptacles are secured to the wires at equivalent distances, and the whole line of receptacles is drawn into the conduit from one end. It will be noted that since the blocks correspond to the inside shape of the conduit the receptacles cannot turn in the conduit, and will always remain in proper alignment. When the receptacles have been drawn into position the cover plates are screwed in place, anchoring the receptacles firmly in place. If desired, however, the receptacles may be inserted through the back of the conduit after the bottom plate 18 has been removed. After the receptacles have been inserted into the conduit, the bottom plate 18 is replaced. In case it is desired to have any extra wires in the conduit, as may be needed for switches or for plural circuits, these may be run in the space between the conduit and cut away shoulders 48 on the sides of the block 19. The particular form of electrical contacts may be varied as desired. In Fig. 6 has been shown a clip 49 having a reversely bent portion 50 which adds somewhat to its springiness and contact making ability. The slots in the receptacle block are of course formed to correspond with the particular clip used, so that the prongs of a plug will make tight contact in all cases.

The receptacle shown in Fig. 7 is similar in purpose and use to the one previously described, but is somewhat different in construction. In this case the block 55 of insulating material forming the body of the receptacle is provided with main wire receiving grooves 56 preferably of constant width throughout their lengths. Between these grooves, and separated from them by barriers 57, is a central auxiliary wire receiving groove 58. Instead of having the slots for receiving the prongs of a connecting plug spaced longitudinally along the block, as was true in the form first described, the slots 59 and 60 are spaced laterally across the upper or front side of the block at either side of the recess 61 which receives the boss on the cover plate. By this arrangement a clip 62 can be formed which takes up less space transversely of the block than in the case first considered. Each clip 62 has a projecting portion 63 formed as in the usual connector to receive a wire 64 in place to be secured by a binding screw 65. The bottom or rear side of the block is covered by a sheet of insulation 66 having its ends 67 upturned to embrace the ends of the block and cut away at 68 to permit the passage of the wires. This sheet of insulation may be made with its ends slightly converging, so that a light spring pressure is brought to bear on the ends of the block sufficient to cause the sheet to remain in place while the receptacle is being led into the conduit.

Figure 8:
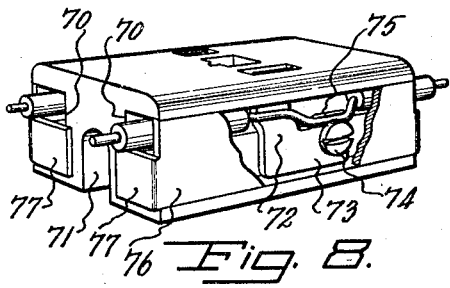
Fig. 8 is a perspective view, partly broken away, of another modified form of receptacle.

The modification of Fig. 8 is similar to that of Fig. 7 in the disposition of the prong receiving slots, but has a different arrangement of wire receiving grooves. The main grooves 70 are formed in the sides of the block, and the supplemental wire groove 71 is located centrally in the bottom. In this case the clips 72 are struck up from connector plates 73 having the usual binding screws 74 and wire retaining clips 75. The metallic parts are insulated from the inside of the conduit by strips 76 of insulating material fitting snugly into the grooves 70 and bent over at their ends as at 77.

Figure 9:
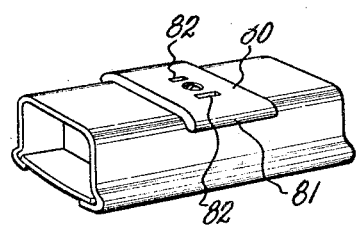
Fig. 9 is a perspective detail of a conduit showing a modified form of cover plate.
Figure 10:
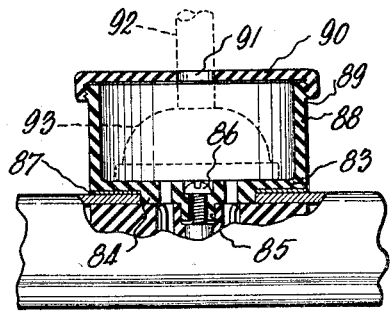
Fig. 10 is a side elevation, partly broken away, showing a cover plate adapted for use particularly on outdoor installations where current is to be taken from the circuit by a flexible cord.

The cover plate 80 for either of the forms shown in Figs. 7 and 8 may be made as shown in Fig. 9, in which the sides are bent down at 81 to conform to the shape of the conduit. Except for this feature and the difference in the disposition of the prong receiving slots 82 the plate may be made as in the form shown in Fig. 5. Another type of cover plate, intended particularly for cases where the installation is to be used in exposed locations, is shown in Fig. 10. The cover plate 83 there shown has a circular boss 84 to enter the hole in the conduit, and a smaller boss 85 corresponding to the boss 41 of Fig. 5. It is held in place by a screw 86 passing through the boss 85 and threaded into the insert 31 formed in the center of the receptacle block. A gasket 87 is preferably placed between the cover plate and the conduit, so that a water tight joint is obtained. The sides of the cover plate are turned up to form a circular flange 88 provided with screw threads 89 to receive a similarly threaded cover 90. The cover 90 shown is formed with a hole 91 to permit the passage of a rubber sheathed conductor 92 attached to the usual pronged plug 93, the conductor fitting tightly so that moisture will not leak through. When the plug 93 is removed the cover 90 is replaced by a similar cover without the central hole 91.

Figure 11:
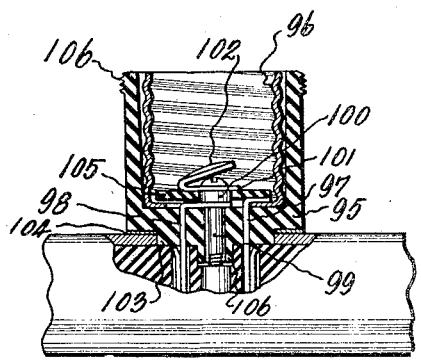
Fig. 11 is a side elevation, partly broken away, showing a receptacle cover adapted for use with an incandescent lamp.

In Fig. 11 is shown a form of plug adapted for use with any of the receptacles shown and permitting the direct attachment of the usual screw base electric lamp. In the body 95 of this socket is held the usual sheet metal screw threaded cup 96, to which is soldered one prong 97 adapted to engage the contact clips of the receptacle. The second prong 98 is bent over and perforated to receive a screw 99 passing freely through a central hole in the plug and threaded into the insert 31 in the receptacle. Above the bent over part of this clip is a collar 100 against which the perforated end 101 of the lamp contact 102 rests. The head of the screw 99 bears against the contact end 101 and when tightened will not only hold this contact in position but will also hold the entire plug socket in position against the receptacle. A circular boss 103 fits within the hole in the conduit, and a gasket 104 is preferably placed between the body of the plug and the conduit. A disk of insulation 105 is shown between the contact 102 and the end of the cup 96 to prevent accidental short circuiting. The plug 95 may also have a square boss 106 corresponding to the boss 40 of plate 35. A screw thread 106ª or other retaining means for a shade may be provided on the plug 95 if desired. It will be noted that the cover plates 35, 80, and 83, and also the plug 95, all serve a dual purpose, both securing the receptacle firmly in place in the conduit and affording means whereby electrical connection may be made to the receptacle.

Figure 12:
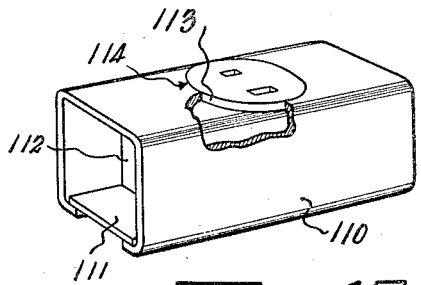
Fig. 12 is a perspective detail showing a modified construction of conduit and receptacle.

In cases where the back of the conduit is to be removed when the wiring is done it is possible to do without the cover plate, as indicated in Fig. 12. In that case 110 represents the conduit, 111 the removable back, and 112 the receptacle block, which may be of any of the types previously considered. The receptacle block is formed with a cylindrical boss 113 adapted to fit into the hole 114 in the front wall of the casing. When this type of block is used the back of the conduit is removed, the wired-up block is put in place with the boss 113 fitting within the hole 114, and the back 111 replaced. The receptacle block is formed so as to be a snug fit within the conduit, so that the boss 113 will effectively prevent any movement of the receptacle once the conduit back is in place. A cover plate may be applied over this boss if desired but in this case its use is not necessary. It will be understood that in this case, as in the others described, the receptacle may be protected by a blank cover plate, that is, a cover plate without the prong receiving slots, in case the plug is to be left exposed without the attachment of an electric circuit to it. It will also be understood that the receptacles shown are adaptable for use with other types of conduits, or to other methods of mounting not involving what in technical strictness might be referred to as a conduit while retaining certain of the advantages of the invention.

What I claim is:

1. An electrical wiring installation comprising a conduit, a receptacle having prong-receiving contacts, and wire-retaining means connected with said contacts, a cover plate having a circular projecting flange thereon and adapted to be positioned on the outside of the conduit, said cover plate having a boss adapted to enter a hole in the conduit, means for securing the cover plate and the receptacle together, a removable cover threaded onto the circular flange of the cover plate, and prong-receiving slots formed in the cover plate and in the receptacle to permit the prongs of a plug to reach said prong-receiving contacts.

2. A receptacle for use in connection with an apertured conduit having conductors extending longitudinally therethrough, said receptacle having power take-off contacts accessible through an aperture in the conduit and being of a cross-sectional size and outline substantially corresponding to the inside of the conduit, having main conductor receiving recesses extending longitudinally along the side of the receptacle remote from the power take-off contacts and having extra conductor receiving recesses extending longitudinally along the edges of the receptacle adjacent the power take-off contacts, conductor engaging contacts located within the main conductor receiving recesses and electrically connected to the power take-off contacts, and means to hold the receptacle to the conduit with the power take-off contacts exposed at said aperture.

3. In apparatus of the type described, an elongated conduit provided with an aperture intermediate its ends, an attachment receptacle provided with a recess and disposed within said conduit at said aperture, said receptacle being of less length than said conduit and having power take-off contacts engageable through said aperture, circuit wires attached to said receptacle, a member detachably secured to said receptacle and adapted to engage said conduit at said aperture, and a boss on said member engageable within said recess in said receptacle to position said receptacle relatively to said member, contact of said receptacle with the interior of said conduit and contact of said member with said conduit at said aperture preventing movement of said receptacle from an operative position at said aperture.

4. A receptacle for use in connection with an apertured conduit, said receptacle having power take-off contacts accessible through an aperture in the conduit and being of a transverse sectional size substantially corresponding to the interior transverse sectional size of the conduit, having main conductor receiving recesses extending longitudinally therethrough, the said recesses having conductor receiving contacts located therein and electrically connected to the power take-off contacts, circuit wires extending longitudinally of the conduit and attached to the said conductor receiving contacts, each of the said main conductor receiving recesses being of a size to receive a circuit wire, and another recess formed substantially in the middle of the side of the receptacle remote from the power take-off contacts and extending longitudinally of the receptacle, the said recess containing no conductor receiving contacts and serving as an auxiliary wire passage only.

MARTIN J. DE MASK.